United States Patent
Inagaki et al.

(10) Patent No.: US 7,284,238 B2
(45) Date of Patent: Oct. 16, 2007

(54) MULTITHREAD TRACING METHOD AND APPARATUS

(75) Inventors: Iwao Inagaki, Kawasaki (JP); Osamu Furusawa, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/715,769

(22) Filed: Nov. 18, 2003

(65) Prior Publication Data

US 2004/0123274 A1   Jun. 24, 2004

(30) Foreign Application Priority Data

Dec. 18, 2002   (JP)   .............................. 2002-366345

(51) Int. Cl.
  *G06F 9/45*   (2006.01)
  *G06F 11/00*  (2006.01)
(52) U.S. Cl. .......................... 717/128; 714/27; 714/38
(58) Field of Classification Search ................ 717/128; 714/45
  See application file for complete search history.

(56) References Cited

U.S. PATENT DOCUMENTS

| | | | | |
|---|---|---|---|---|
| 4,445,177 A | * | 4/1984 | Bratt et al. ................. | 712/245 |
| 5,758,061 A | * | 5/1998 | Plum .......................... | 714/35 |
| 5,870,606 A | * | 2/1999 | Lindsey ...................... | 717/128 |
| 5,896,536 A | * | 4/1999 | Lindsey ...................... | 717/128 |

(Continued)

FOREIGN PATENT DOCUMENTS

JP   10083326 A   *   3/1998

(Continued)

OTHER PUBLICATIONS

M. Broberg, L. Lundberg, and H. Grah. "Visualization and Performance Prediction of Multithreaded Solaris Programs by Tracing Kernel Threads" In Proceedings of the 13th International Parallel Processing Symposium & 10th Symposium on Parallel and Distributed Processing (IPPS/SPDP) 1999.*

(Continued)

*Primary Examiner*—Tuan Dam
*Assistant Examiner*—J. Derek Rutten
(74) *Attorney, Agent, or Firm*—David Irvin; Steven M. Greenberg; Carey Rodriguez Greenberg & Paul LLP

(57) ABSTRACT

Method and apparatus to enable collection of information required for solving a problem caused by simultaneous access to a shared resource in a multithreading environment. In an information processor capable of executing a routine including a tracing process of collecting information related to the processing status in multithreading, a routine being executed is registered for each thread being activated, and the level of the tracing process for the routine being executed is determined based on information in the registration. The tracing process level for the routine being executed can be determined based on whether any routine identical to, or in a predetermined relation with, the routine is already registered.

20 Claims, 10 Drawing Sheets

U.S. PATENT DOCUMENTS

| | | | |
|---|---|---|---|
| 6,055,492 A * | 4/2000 | Alexander et al. | 702/179 |
| 6,077,311 A * | 6/2000 | Lichtenstein et al. | 717/128 |
| 6,163,881 A * | 12/2000 | Sauvage | 717/128 |
| 6,182,244 B1 * | 1/2001 | Bankemper et al. | 714/38 |
| 6,219,827 B1 * | 4/2001 | Man | 717/128 |
| 6,223,338 B1 * | 4/2001 | Smolders | 717/128 |
| 7,013,456 B1 * | 3/2006 | Van Dyke et al. | 717/130 |
| 7,080,289 B2 * | 7/2006 | Swaine et al. | 714/45 |
| 2003/0159133 A1 * | 8/2003 | Ferri et al. | 717/130 |
| 2005/0091373 A1 * | 4/2005 | Ciapala et al. | 709/224 |
| 2005/0177819 A1 * | 8/2005 | Ober et al. | 717/128 |

FOREIGN PATENT DOCUMENTS

| | | |
|---|---|---|
| JP | 11338733 | 12/1999 |
| JP | 2002055848 | 2/2002 |

OTHER PUBLICATIONS

Abdelwahab Hamou-Lhadj, Timothy C. Lethbridge, "A survey of trace exploration tools and techniques", Oct. 2004, Proceedings of the 2004 conference of the Centre for Advanced Studies on Collaborative research, pp. 42-55.*

Lange, D.B.; Nakamura, Y., "Object-oriented program tracing and visualization", May 1997, Computer, vol. 30, Issue 5, 0pp. 63-70.*

Larus, J.R, "Efficient program tracing", May 1993 , Computer, vol. 26, Issue 5, pp. 52-61.*

"Debugging with GDB", Product documentation, Free Software Foundation, Inc., archived Aug. 9, 2002 at <http://web.archive.org/web/20020809085314/sources.redhat.com/gdb/current/onlinedocs/gdb.html>, Chapters 10, 16, and 17.*

Huggins, McCowan, and Winz, "Method of Tracing Events in Multi-threaded OS/2 Applications", Sep. 1993, IBM Technical Disclosure Bulletin, vol. 36, No. 09A, pp. 19-21.*

* cited by examiner

MULTITHREAD TRACING METHOD AND APPARATUS

FIELD OF THE INVENTION

The present invention relates to an information processor capable of executing a routine including a tracing process in multithreading, a tracing process method in the information processor, a program causing a computer to function as the information processor, and a computer readable recording medium recording the program.

BACKGROUND

In a traditionally known tracing approach used to analyze and identify the cause of a fault occurring in a program, the execution status of the program is output in chronological order to a standard output device such as a file. When trying to acquire more information using tracing, however, additional processing is required beyond processing of the original application logic to record the execution status of the program. This degrades performance. Furthermore, unless information is acquired within a suitable range, a large amount of data needs to be collected, which becomes burdensome to system resources.

Thus, the following measures are traditionally taken for the purpose of tracing in order to minimize the performance degradation and the burden to system resources. For example, it has been known to classify information to be collected according to its importance as specified by a user, in order to avoid acquisition of information with low importance. Alternatively, a tracing function may be provided for a particular thread to collect information only for processing executed on the particular thread.

Also known is the use of a debugging device which classifies threads as exclusive execution threads and other threads, and collects information while controlling the execution order of the threads to prevent the exclusive execution threads from being executed simultaneously. This improves debugging efficiency (see, for example, Japanese Published Unexamined Patent Application No. 11-338733). Also known is a technique in which a normal interpreter and an interpreter for tracing are provided and are switched for use in order to control executability of the tracing function (see, for example, Japanese Published Unexamined Patent Application No. 2002-55848.

According to these known techniques, however, the execution of a trace can be controlled only for predetermined threads and program portions identified in advance or according to settings or setting changes entered by a user before and during execution of the program. In other words, it is impossible to perform information collection suitable for the thread generation status that varies dynamically, in actual operation, in response to various kinds of execution requests. Accordingly, if one of the known tracing technique is used to analyze a fault which occurs only under a multithread environment, information is collected by a tracing process even for cases that do not correspond to the fault occurrence conditions. An example of this occurs when a program is executed in a single thread, and, as a result, the collected information includes a large amount of data which is not related to the cause of the fault occurrence. This large data set requires subsequent analysis, which is burdensome in itself.

In a multithread program, a fault caused by simultaneous execution of a particular process by multiple threads depends on timing considerations such as the processing status of each thread. Accordingly, it is difficult to identify the cause of the fault in comparison with a fault caused in a single thread.

Furthermore, when conventional tracing is used for analyzing a fault which occurs only in a multithread environment, the collected information includes a lot of data unrelated to the cause of the fault, thereby causing a lot of unproductive processing. Accordingly, in some cases, tracing may not be permitted in an actual operational environment.

SUMMARY

An object of the present invention is to provide a tracing technique to facilitate analysis of a problem that may be caused by access to a shared resource by multiple threads, without having major influence on the program execution environment.

The present invention includes a tracing process method in an information processor capable of executing a routine, including a tracing process of collecting information related to processing status in multithreading. The tracing process method comprises a routine registration step wherein the information processor registers a routine being executed for each thread being activated, and a level determination step for determining a level of a tracing process for the routine being executed based on registration information.

A tracing process described herein may include, for example, a process of outputting contents of a predetermined message or a predetermined variable to a log file and the like. A routine is a series of program codes for performing some process. A routine may include, for example, a function or a method. Determination of the level of a tracing process may include, for example, determination of whether or not to perform a tracing process, or determination of whether to perform a tracing process for all collectable information, or for all information except for some particular information, or for no information. Registration of a routine being executed means that the routine is registered when its execution starts, and then the registration is deleted when the execution ends.

In this configuration, at the routine registration step, a routine is registered when a thread is activated for execution of the routine. The registration of the routine is deleted when the execution ends and the thread disappears. Accordingly, registration of a routine being executed is performed for each thread. In a level determination step, the level of a tracing process for the routine being executed is determined based on registration information of the routine being executed. In this case, the level can be determined to be a level permitting a tracing process when the same routines are executed in different threads, and otherwise determined to be a level not so permitting, for example. The result of such determination varies as the registration information changes with time. In other words, executability or degree of the tracing process for the routine being executed is dynamically determined depending on which routines are executed in other threads. The executability or level of the tracing process can be dynamically controlled based on the result determined.

The level determination step can determine the level of the tracing process for the routine being executed based on whether any routine identical to or in a predetermined relation with the routine is already registered. In this case, a table may be referred to, in which routines having a predetermined mutual relation are specified. In addition, the information processor may be adapted to accept input for setting or changing the table. The routines in a predetermined relation may be, for example, routines that access a shared resource or routines that cause a problem when they execute simultaneously.

The level determination step may determine, for example, the level of the tracing process for the routine being executed. The level of the tracing process may permit unrestricted execution of the tracing process if any routine identical to, or in a predetermined relation with, the routine being executed is already registered, and may block execution of the tracing process if no such routine is already registered. Alternatively, when the registration is performed, the level determination step may add simultaneous execution information to that effect to the registration information of both routines if any routine identical to, or in a predetermined relation with, the routine being executed is registered. The level determination step may add trace level information indicating the level of the tracing process to the registration information of the both routines when adding the simultaneous execution information.

The tracing process method may comprise a step of executing a server program including the routine and the tracing process; an application execution control step of executing the routine in response to a call by a client program; and a tracing execution step of executing the tracing process. The tracing process method may comprise a step of executing a program using the routine and tracing process; a step of executing the routine including the tracing process stored in a shared library; and a tracing execution step of executing the tracing process at the routine execution step. In these cases, the tracing execution step refers to the result of the determination at the level determination step in executing the tracing process.

An information processor according to the present invention may be configured to perform each of the steps of the tracing process method according to the invention, which steps have been described above.

A computer program product according to the present invention causes a computer to function as the information processor according to the present invention and each of the means of the information processor.

A recording medium according to the present invention is a computer readable recording medium recording the computer program product according to the present invention.

DETAILED DESCRIPTION

Figure 1:
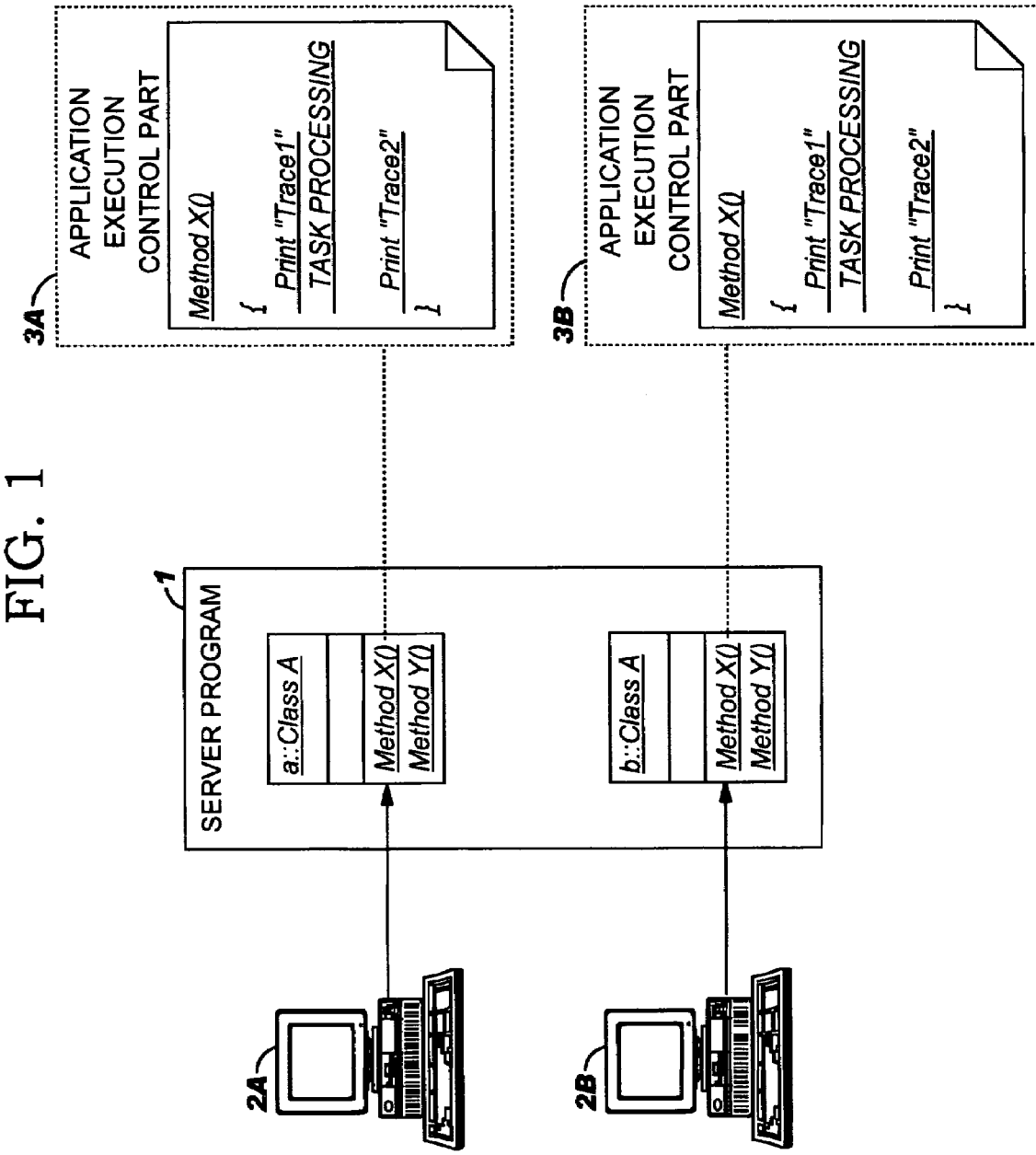
FIG. 1 shows a client/server system based on an object request broker (ORB) communication infrastructure to which the present invention can be applied.

FIG. 1 shows an exemplary client/server system based on a communication infrastructure using ORB (Object Request Broker) technology to which the present invention can be applied. The ORB is software for establishing connection between a client and a server object to enable the server to call a method of the server object. A client/server application operating on the system has a server program 1 and client programs in client machines 2A, 2B. A method of an object defined by the server program 1 is executed by application execution control parts 3A, 3B. In the server program 1, instances a and b belonging to a Class A, for example, are defined, and each instance has a method X and a method Y with a tracing process included therein. The application execution control parts 3A, 3B are equivalent to, for example, Java⁶ Virtual Machines, and execute platform-independent bytecodes, thereby enabling execution of a method irrespective of the OS (operating system) of the server.

When the client program calls the method X, the application execution control parts 3A, 3B sequentially interpret and execute the bytecodes of the method X in single threads generated by the OS. When client programs in the different client machines 2A, 2B call the method X at the same time, the different application execution control parts 3A, 3B execute in parallel the method X of the instances a and b of the Class A, respectively, in different threads.

Figure 2:
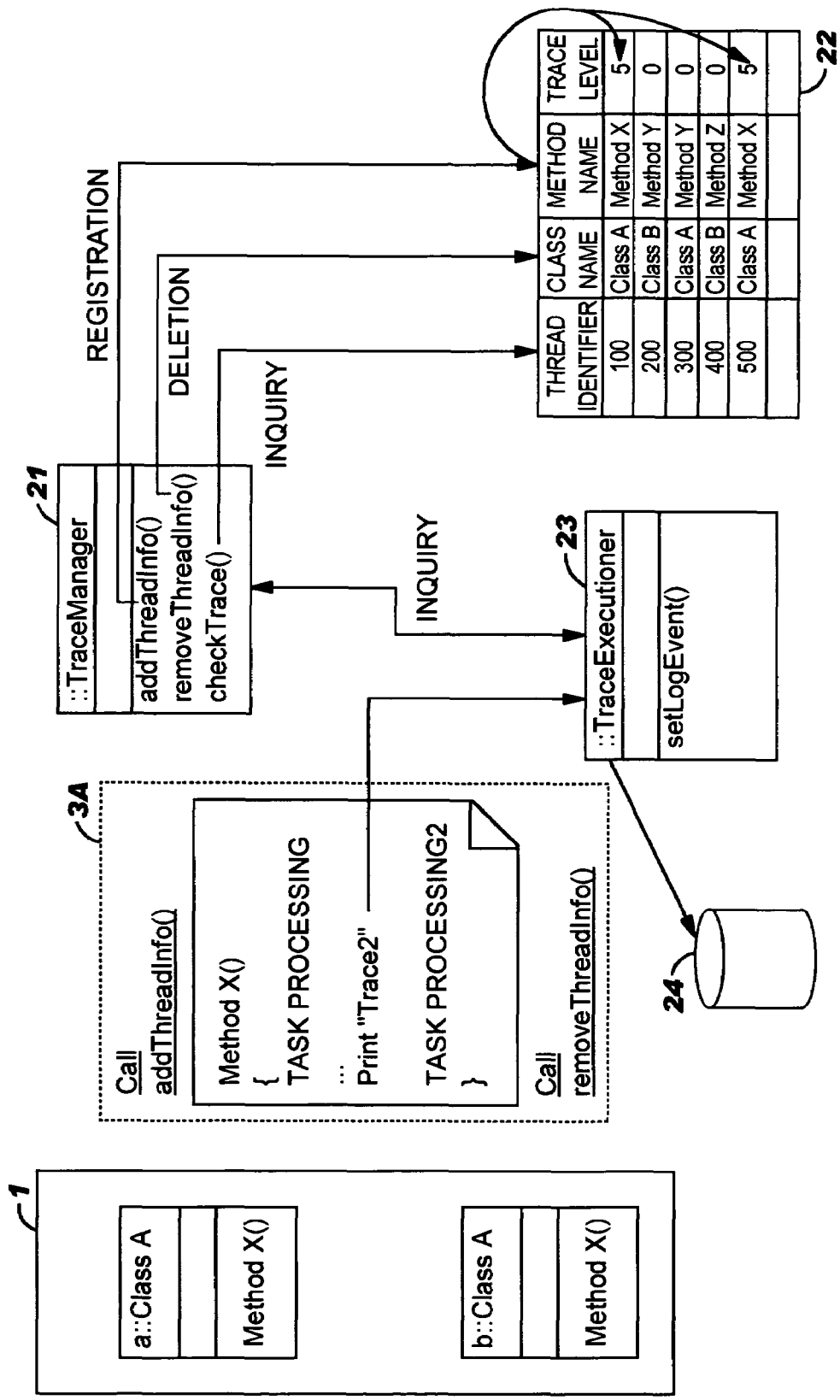
FIG. 2 shows a system in a server based on an ORB communication infrastructure according to an embodiment of the present invention, and a processing sequence in the system.

According to prior-art tracing approaches, in such a system the necessity of a tracing process is determined for each of all the threads with reference to tracing control information statically set, such as global variables and the like. In contrast to the methods of the prior art, a first embodiment of the present invention introduces a trace manager 21 and a thread processing multiplicity management table 22 to the system shown in FIG. 1, as shown in FIG. 2, so that output of tracing information to a log file 24 by a trace executioner 23 can be dynamically controlled depending on whether or not a method being executed in a thread being activated is identical.

The thread processing multiplicity management table 22 is a table for registration of a method being executed for each of the threads being activated. Each of the records of the table includes a thread identifier for identifying a thread being activated, a class name and method name for identifying a method being executed in its corresponding thread, and a trace level. The trace level includes a flag that is set to indicate tracing process executability for a method being executed in its corresponding thread. As the flag, "5" may be used to indicate permission to execute a tracing process and "0" to indicate that permission is denied to execute a tracing process.

The trace manager 21 has a method "addThreadInfo()" for registering a generated thread with the thread processing multiplicity management table 22 in response to a request by the application execution control parts 3A, 3B, and a method "removeThreadInfo()" for deleting registration of a deleted thread from the thread processing multiplicity management table 22. The trace manager 21 has also a method "checkTrace()" for, in response to an inquiry specifying a thread identifier from the trace executioner 23, checking tracing process executability with reference to the thread processing multiplicity management table 22 to make a reply. The trace executioner 23 has a method "setLogEvent()" for inquiring the trace manager 21 about tracing process executability in response to a request by the application execution control parts 3A, 3B, and executing or blocking a tracing process according to the result of the reply.

In this configuration, when the client program calls a method of the server program 1, a thread is generated by the OS, and execution of the called method is requested from the relevant application execution control parts 3A, 3B (process (1)).

On receiving the execution request, the application execution control part 3 requests registration of the generated thread with the thread processing multiplicity management table 22 from the trace manager 21, and notifies the identifier of the generated thread, the class name, and the method name of the called method (call "addThreadInfo()"; process (2)) before actually executing the called method.

In response to the request, the trace manager 21 registers the notified thread identifier, class name, and method name with the thread processing multiplicity management table 22 (addThreadInfo(); process (3)). The trace manager 21 then checks whether there is already registered, with the thread processing multiplicity management table 22, any method that has the same class name and method name of the method to be registered. If it is determined that such a method is registered, then "5" is set for the trace level in the registration records of the identical methods (process (4)).

For example, when the thread processing multiplicity management table 22 is as shown in FIG. 2, and the identifier of the thread to be registered is "500," and the class name and the method name of the method are "Class A" and "Method X", respectively, then "5" is set for the trace level in the records with thread identifiers "500" and "100," because a method having the same class name and method name is already registered as a method having a thread identifier "100".

If one of the application execution control parts 3A, 3B encounters a print instruction such as "Print "Trace2"" while executing a method called by the client program, it requests the tracing process from the trace executioner 23 (Print "Trace2": process (5)). Upon receiving the request, the trace executioner 23 queries the trace manager 21 about executability of the requested tracing process (process (6)). The query is accompanied by an identifier of a thread related to the requested tracing process.

In response to the query, the trace manager 21 checks the value of the trace level in the record having the thread identifier related to the inquiry, in the thread processing multiplicity management table 22 (checkTrace(): process (7)), and notifies the trace executioner 23 about tracing process executability (process (6)). The trace executioner 23 executes the requested tracing process (setLogEvent(): process (8)) or skips it based on the notification. For example, if the requested tracing process is a tracing process for a thread with an identifier "100," the tracing process is executed because the trace level thereof is "5" in the thread processing multiplicity management table 22.

On the other hand, when execution of any method called from the client program ends and its corresponding thread is deleted, the relevant application execution control parts 3A, 3B requests that the registration related to the thread be deleted from the trace manager 21 (Call removeThreadInfo (); process (9)). On receiving the request, the trace manager 21 deletes the registration of the thread from the thread processing multiplicity management table 22 (removeThreadInfo(); process (10)). In this case, as for a record to be deleted having the same class name and method name, "0" is set for the trace level, unless there is any other record having the same class name and method name. For example, suppose that the thread processing multiplicity management table 22 is in the condition shown in FIG. 2, and the record with a thread identifier "100" is to be deleted. The trace level of the record with a thread identifier "500," which has the same class name "Class A" and method name "Method X," is changed to "0."

Figure 3:
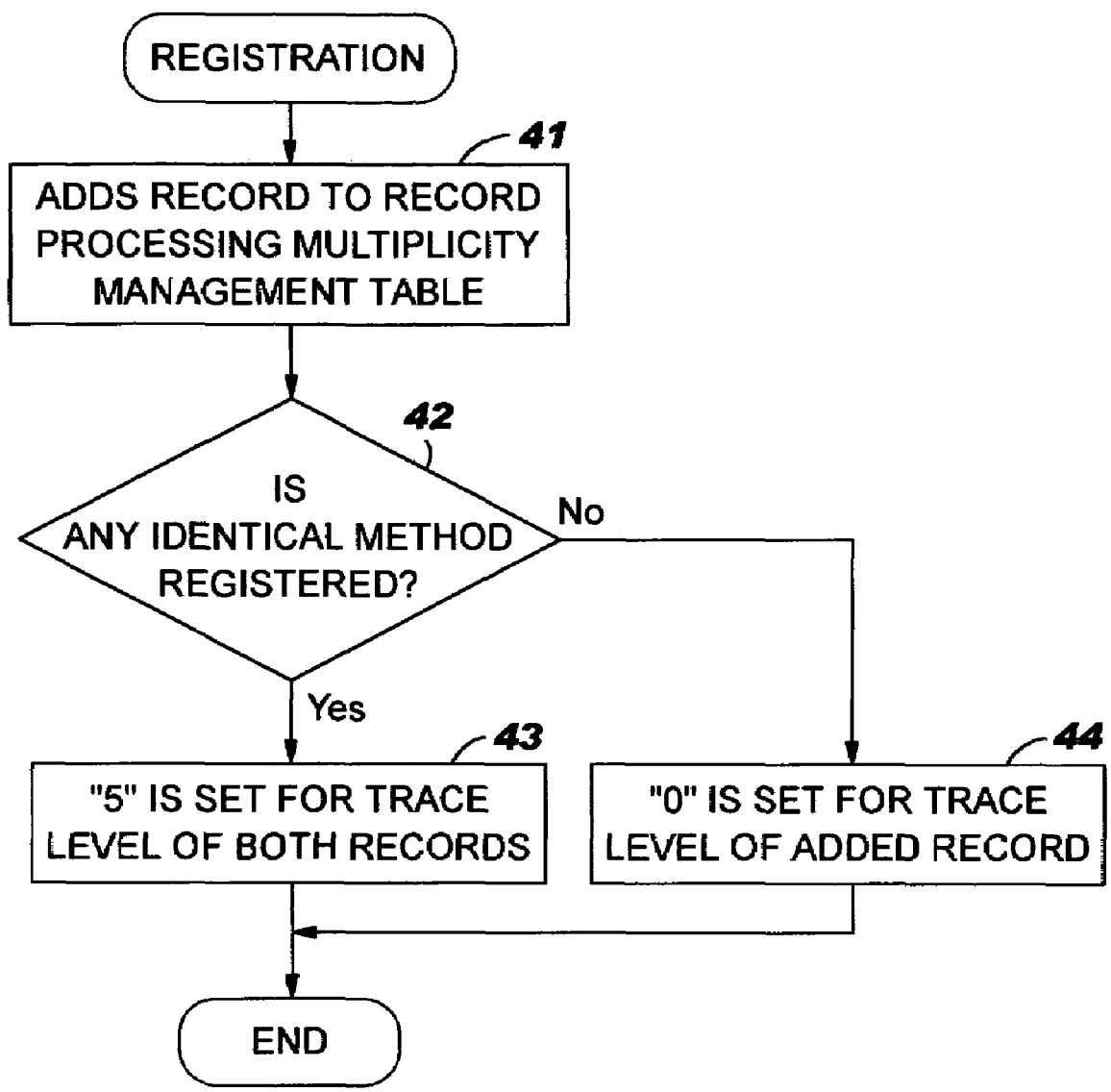
FIG. 3 is a flowchart showing a registration process suitable for use in a system of the kind illustrated in FIG. 2.
Figure 4:
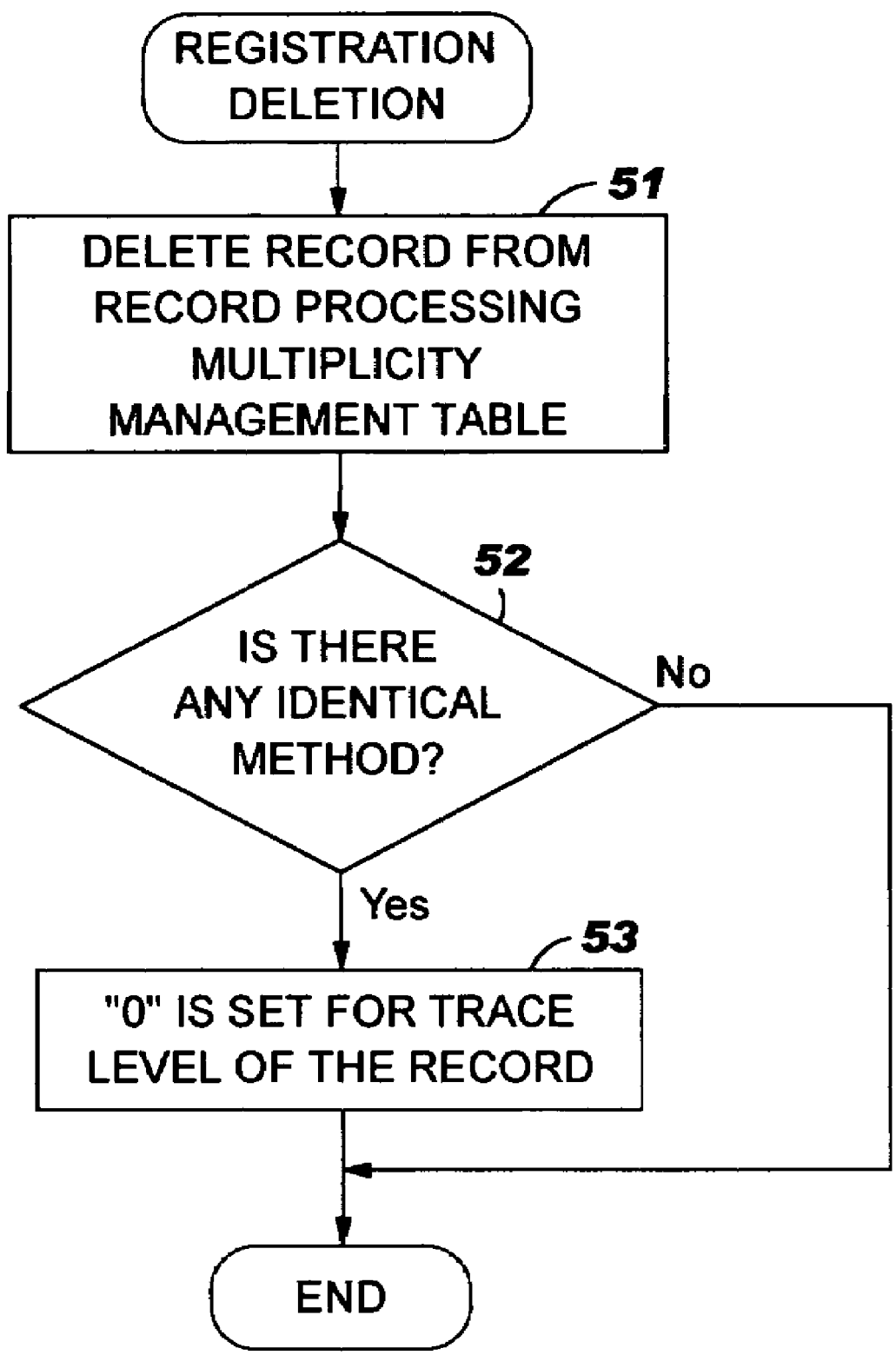
FIG. 4 is a flowchart showing a registration deletion process suitable for use in a system of the kind illustrated in FIG. 2.
Figure 5:
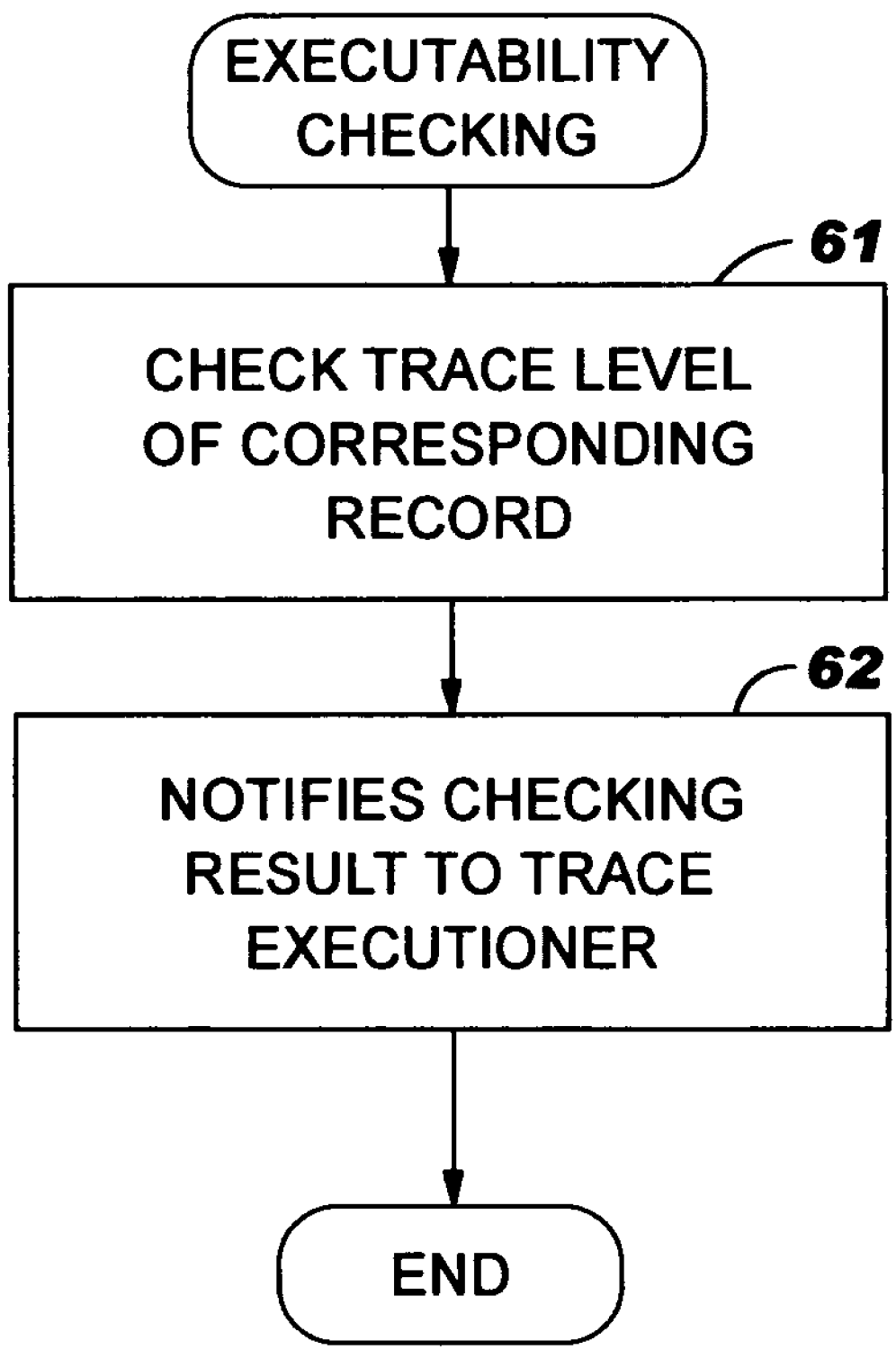
FIG. 5 is a flowchart showing an executability checking process suitable for use in a system of the kind illustrated in FIG. 2.

FIGS. 3 to 5 show a process performed by the trace manager 21 described above. The trace manager 21 executes the registration process (addThreadInfo()) shown in FIG. 3 or the registration deletion process (removeThreadInfo()) shown in FIG. 4 when receiving from the application execution control parts 3A, 3B a registration request related to a generated thread, or a registration deletion request related to a thread to be deleted, respectively. The trace manager 21 executes the executability checking process (checkTrace()) shown in FIG. 5 when receiving, from the trace executioner 23, an inquiry about tracing process executability.

In registration, one record in the format shown in FIG. 2 is added to the thread processing multiplicity management table 22 as shown in FIG. 3 (step 41). If there is already a registration related to the same method, then "5" is set for the trace level in both records. Otherwise, "0" is set for the trace level of the added record (steps 42 to 44). In deleting registration, the relevant record is deleted (step 51) as shown in FIG. 4. If there is another record related to the same method of the deleted record and there is only one such record, then "0" is set for the trace level (steps 52 and 53). In checking tracing process executability, as shown in FIG. 5, the trace level of the relevant record is checked with the identifier of the thread related to the tracing process used as the key, and the result is provided to the trace executioner 23 (steps 61 and 62).

In this way, the trace manager 21 maintains and manages the registration contents of the thread processing multiplicity management table 22 so that only threads that are currently executed are all registered, and so that "5" is set for the trace level for threads having the same class name and method name. The trace manager 21 also checks tracing process executability for each thread based on the thread processing multiplicity management table 22.

A method being executed is registered for each thread being activated in a server capable of executing a method including a tracing process in multithreading. The tracing process executability for the method being executed is determined based on registration information, so that the tracing process executability can be dynamically determined according to the method being executed in each of the threads being activated at the determination point. In other words, the possibility of a problem caused by access to a shared resource constantly varies depending on what methods are simultaneously executed, and a tracing process to solve the problem is performed only when there is a possibility that the problem will occur, depending on the varying condition. Thus, the tracing process can be performed without collecting a lot of unnecessary information, and analysis of a problem can be facilitated without having major influence on the program execution environment.

Furthermore, the tracing process executability for a method being executed is determined based on whether or not the same method is already registered, so that it is possible to perform the tracing process only when there is a high probability that a problem will be caused by access to a shared resource.

Furthermore, in registration with the thread processing multiplicity management table 22, if any method identical to the method to be registered is already registered, simultaneous execution information to that effect, which is indicated as "5," is recorded for the trace level item in the registration records of the both methods. Accordingly, a determination about tracing process executability can be obtained immediately without searching the thread processing multiplicity management table 22 again.

In the embodiment described above, a simple condition is used to update tracing process executability. That is, tracing process executability is updated when simultaneous execution of the same methods is started. In a second embodiment described below, the tracing process executability is controlled by more complex conditions. That is, a tracing condition management table is introduced, and by specifying the conditions for the tracing process executability in this table, the control of tracing process executability is carried out more flexibly.

Figure 6:
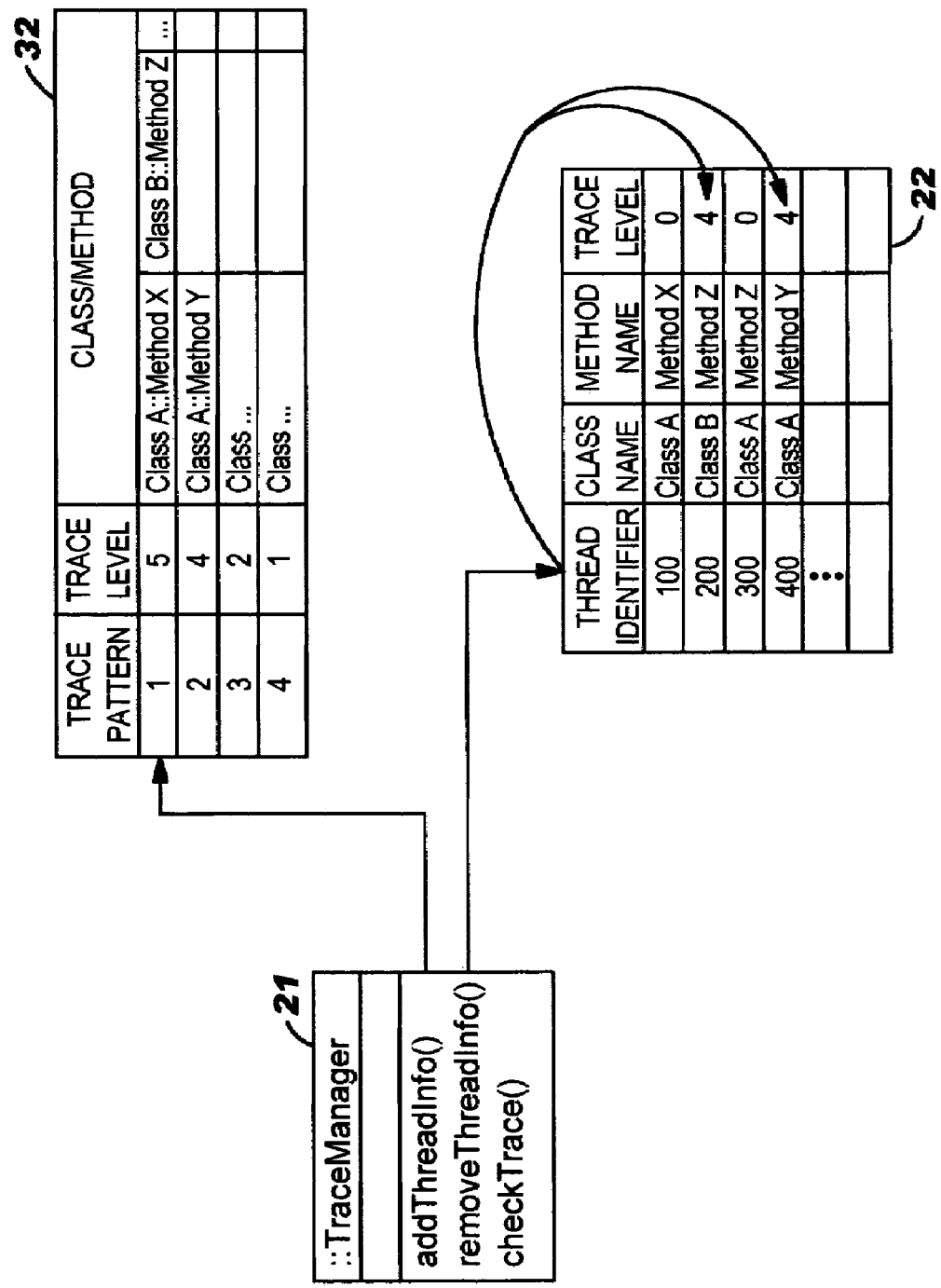
FIG. 6 shows a system and a process flow according to another embodiment of the present invention.

FIG. 6 illustrates aspects of a system according to the second embodiment of the present invention. This system provides a trace manager 31 instead of the trace manager 21 in the first embodiment. The trace level in the thread processing multiplicity management table 22 is set or changed with reference to a tracing condition management table 32. Furthermore, not only the two levels of permitting and prohibiting a tracing process but also more levels can be set for the trace level. A reply to an inquiry about tracing process executability is made based on the set level. As for other points, the second embodiment is similar to the first embodiment described above.

Multiple trace patterns are defined in the tracing condition management table 32. Each record in the table includes the following items: trace pattern, trace level, and class/method. A pattern number for differentiating each trace pattern is stored for the trace pattern item, a level number indicating the degree of tracing process for the pattern is stored for the trace level item, and a class name and method name identifying a method, to which the trace pattern is applied, is stored for the class/method item.

For the class/method item in each record, class names and method names of multiple methods having a certain relation may be recorded. When these methods having a certain relation are simultaneously executed, the trace level of a record specifying the methods as those having the certain relation is applied to the tracing process for the methods. When the same methods are simultaneously executed, the trace level specified for the method is applied.

The methods having a certain relation include, for example, methods that access a common resource. In the example of FIG. 6, "Class A::Method Y" and "Class B::Method Z" are specified as the methods having a certain relation in the record having a trace pattern shown by the lower path of the Figure.

Figure 7:
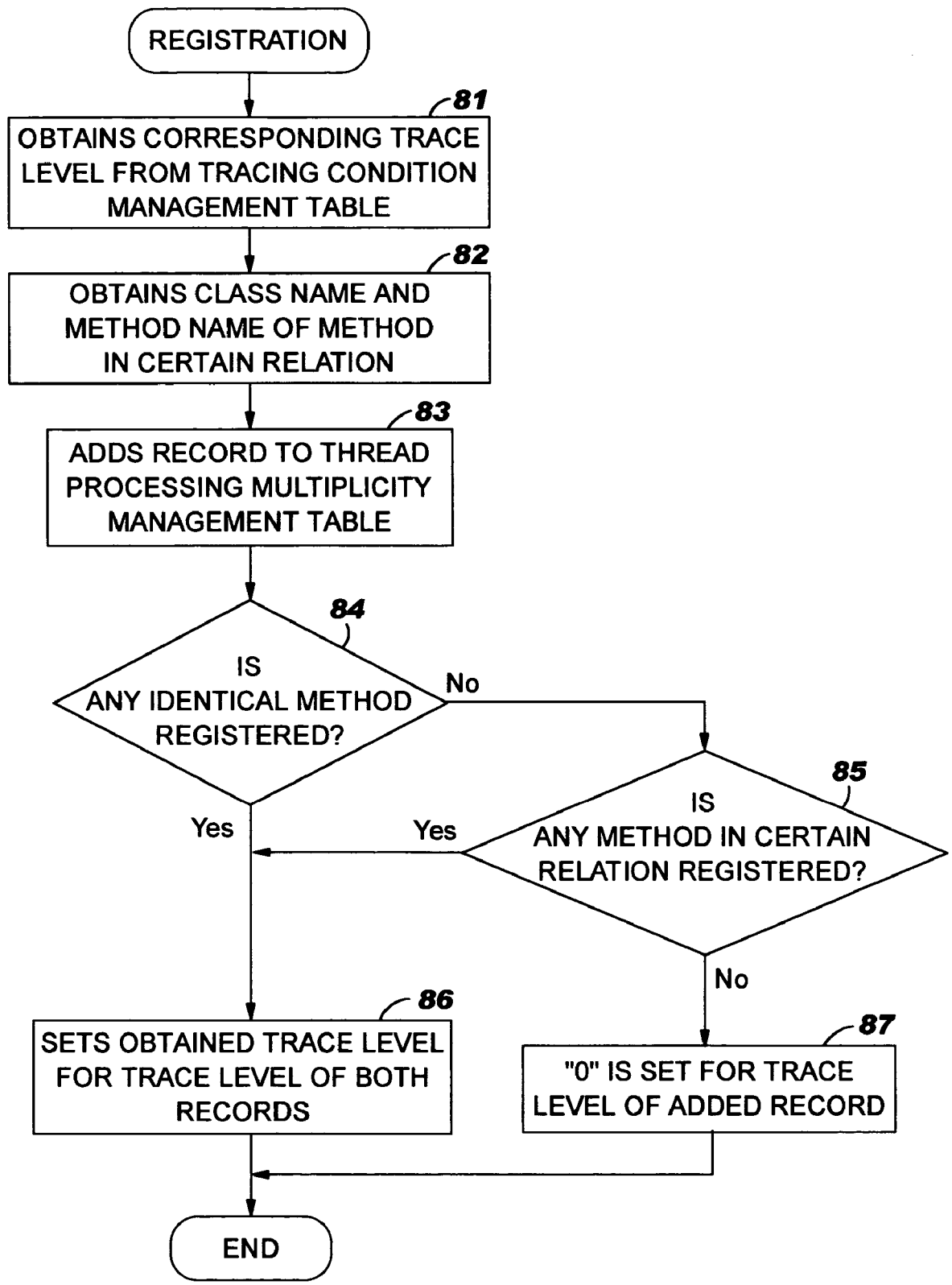
FIG. 7 is a flowchart showing a registration process by a trace manager suitable for use in a system of the kind illustrated in FIG. 6.
Figure 8:
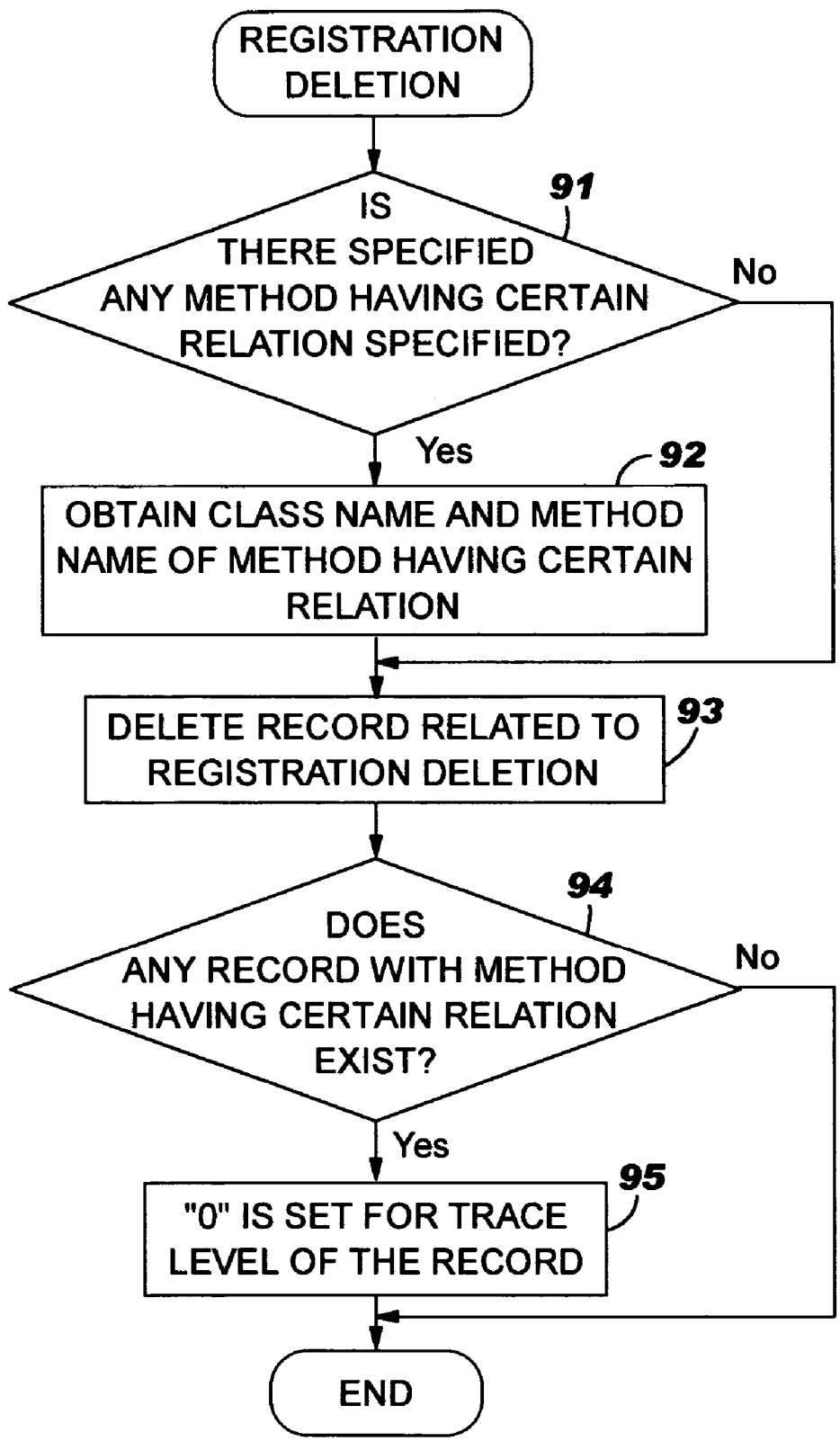
FIG. 8 is a flowchart showing a registration deletion process by a trace manager suitable for use in a system of the kind illustrated in FIG. 6.
Figure 9:
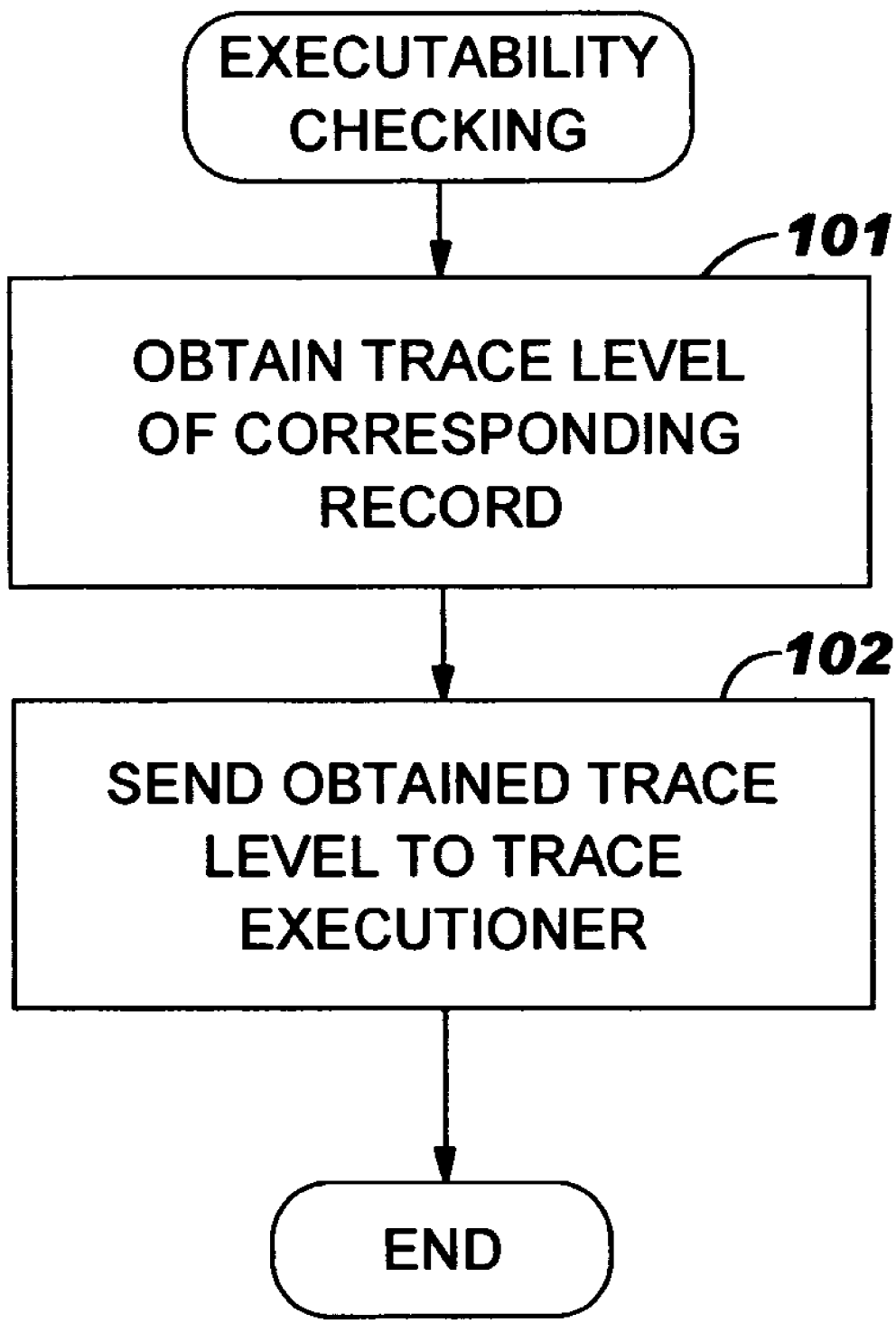
FIG. 9 is a flowchart showing an executability checking process by a trace manager suitable for use in a system of the kind illustrated in FIG. 6.

FIGS. 7 to 9 show a registration process, a registration deletion process and an executability checking process by the trace manager 31, respectively. The trace manager 31 performs the registration process (addThreadInfo()) shown in FIG. 7 or the registration deletion process (removeThreadInfo()) shown in FIG. 8 when receiving a registration request related to a generated thread or a registration deletion request related to a thread to be deleted from the application execution control part 3A, 3B (FIG. 2). The trace manager 31 performs the executability checking process (checkTrace()) shown in FIG. 9 when receiving an inquiry about tracing process executability from the trace executioner 23.

In the registration process, as shown in FIG. 7, a record which has, for the class/method item, a method identical to the method to be executed by the thread is searched in the tracing condition management table 32 first to obtain its corresponding trace level (step 81). If class names and method names of the other methods having the certain relation are recorded in the record, they are also obtained (step 82) (as shown by the process illustrated by the upper path of FIG. 6).

Then, a record having the identifier of the thread requested to be registered is added, and the class name and method name of the method to be executed by the thread are recorded, thus adding a new entry to the thread processing multiplicity management table 22 (step 83). It is then determined whether the thread processing multiplicity management table 22 includes any record having the same class name and method name as the added record (step 84). If there is any such record, the obtained trace level is set for the trace level of both the existing record and the added record (step 86). It is also determined whether there is any record having the same class name and method name as those obtained in the thread processing multiplicity management table 22 (step 84). If there is any such record, the obtained trace level is set for the trace level of both the existing record and the added record (step 86). If there is not any record having the same class name and method name as those obtained, "0" is set for the trace level of the added record (step 87). The registration of the thread then ends.

In the registration deletion process, as shown in FIG. 8, a check is first made to determine whether any method is specified having the certain relation with the method to be executed by the thread in the thread processing multiplicity management table 32 (step 91). If there is any such method having the certain relation, the class name and method name are obtained (step 92).

Next, the record of the thread for which a registration deletion has been requested is deleted (step 93). A determination is them made as to whether there is any record having a class name and method name of a method identical to, or in a certain relation with, a method related to the record to be deleted in the thread processing multiplicity management table 22 (step 94). If there is any such record, "0" is set for the trace level of the record unless there is any other such record (step 95). The registration deletion then ends.

The thread registration and registration deletion processes described above registers only threads being activated, together with information on a class name and method name identifying a method being executed, and tracing process executability and level, with the thread processing multiplicity management table 22.

In the executability checking process, as shown in FIG. 9, a trace level corresponding to a thread related to an inquiry is obtained from the thread processing multiplicity management table 22 using a thread identifier as a key (step 101), and is sent to the trace executioner 23 (step 102).

The trace executioner 23 executes a tracing process according to the trace level which has been sent. For example, the tracing process is not executed if the trace level is "0", and otherwise the tracing process is executed, or only partially executed according to the value of the level.

An example of the above registration, registration deletion, and tracing executability checking processes is described below more particularly. When the contents of the thread processing multiplicity management table 22 and the tracing condition management table 32 are as shown in FIG. 6, and registration of a thread with an identifier "400", for example, is requested, there exists the class/method "Class A::Method Y" of the method to be executed in the thread in the tracing condition management table 32 and its trace level is "4." There also exists another method "Class B::Method Z" in the certain relation. The method in the certain relation is already registered as a method related to a thread with an identifier "200" in the thread processing multiplicity management table 22. Accordingly, as shown in FIG. 7, the thread with an identifier "400", which has been requested to be registered, is entered into the thread processing multiplicity management table 22, and "4" is set for each trace level of the record with an identifier "200" and the record with an identifier "400."

Subsequently, if tracing process executability for the thread with an identifier "400" is inquired by the trace executioner 23 (FIG. 2), the trace level "4" in the relevant record in the thread processing multiplicity management table 22 is revealed to the trace executioner 23. The trace executioner 23 executes a tracing process fully or in part.

On the other hand, when registration deletion is requested for a thread with an identifier "200" by the application execution control part 3, there exists the class/method "Class B::Method Z" related to the thread in the record with a trace pattern 2 in the tracing condition management table 32. There is also defined a method/class "Class A::Method Y" having a certain relation in the same record. Accordingly, in this case, the trace manager 31 deletes the record with an identifier "200" in the thread processing multiplicity management table 22 and sets "0" for the trace level of the record with an identifier "400" the method of which is in a certain relation. After that, the tracing process for the thread with an identifier "400" is inhibited.

Figure 10:
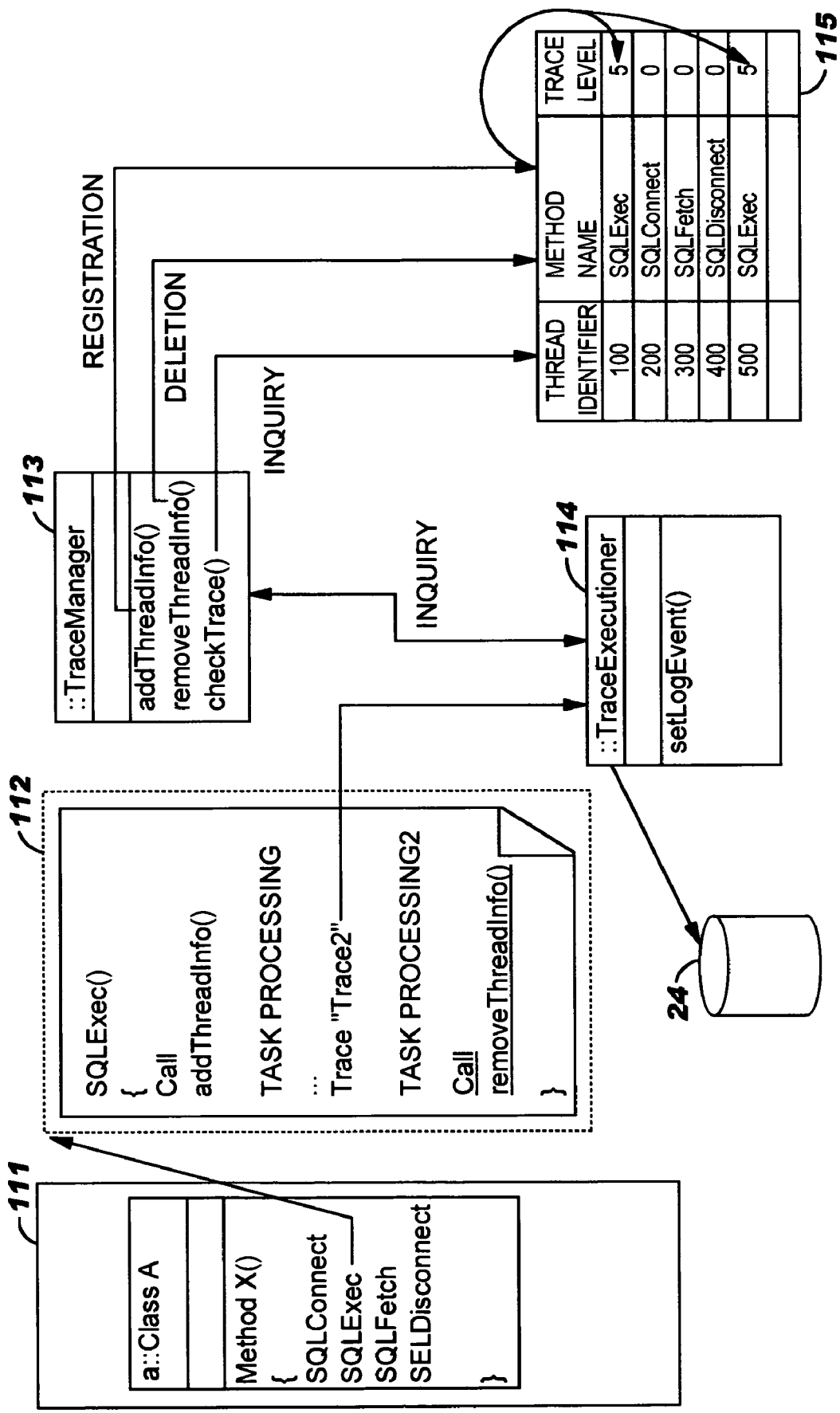
FIG. 10 shows a system configuration and a processing sequence in a server according to yet another embodiment of the present invention.

FIG. 10 shows a system configuration and a processing sequence in a server according to a third embodiment of the present invention. In this embodiment, a server program calls a method in a shared library to execute a multithreading process. The system in FIG. 10 comprises a server program 111, a shared library 112 used by the server program 111, a trace manager 113 for registering only threads being executed and responding to inquiries about tracing process executability based on registration information, a trace executioner 114 for, in response to a request of tracing process execution by a method in the shared library which is being executed, inquiring the trace manager 113 about tracing process executability, and executing, fully or in part, the tracing process based on the response, and a thread processing multiplicity management table 115 with which threads are to be registered. There are recorded an identifier of a thread to be registered, a method name of a method to be executed by the thread, and a trace level in each record in the thread processing multiplicity management table 115. If the trace level is "0", the tracing process for the corresponding thread is inhibited, i.e., blocked, and if the trace level is "5", it is permitted.

In this configuration, when the server program 111 calls a method in the shared library 112, for example, "SQLExec()" (process (1)), a thread to execute the method is generated. Then, the method requests registration of the generated thread from the trace manager 113 (process (2)). This request is made by calling "addThreadInfo()" in the trace manager 113 in the example of FIG. 11.

Receiving the request, the trace manager 113 performs the requested registration of the thread (addThreadInfo(): process (3)). The trace manager 113 then checks whether any thread executing the same method is registered in the thread processing multiplicity management table 115. If no such thread is found, "0" is set for the trace level. Otherwise, "5" is set for the trace level of both threads (process (4)). In the example of FIG. 10, the method "SQLExec" executed by the thread "500" to be registered is also executed by a thread "100," and thus "5" is set for the trace level of both threads.

When a method in the shared library 112 which is being executed requests execution of a tracing process, for example, "Trace "Trace2"" from the trace executioner 114 (process (5)), the trace executioner 114 identifies the identifier of the thread executing the method and queries the trace manager 113 about tracing process executability (process (6)). In response to the inquiry, the trace manager 113 determines tracing process executability for the thread related to the inquiry based on the trace level in the thread processing multiplicity management table 115 (process (7)) and provides the result to the trace executioner (process (6)). In the example of FIG. 10, this process is performed by a method "checkTrace()." If the method related to the inquiry is "SQLExec," for example, then permission of tracing process execution is granted because the trace level is "5." Based on this notification, the trace executioner 114 performs the requested tracing process execution with a log file 24 as an output target (setLogEvent(); process (8)).

When the executed method in the shared library 112 ends, the method requests registration deletion of the thread executing it from the trace manager 113 (Call removeThreadInfo(); process (9)). In response to the request, the trace manager 113 deletes the registration of the thread (removeThreadInfo(); process (10)). As for a record having the same method name of the record to be deleted, "0" is set for the trace level of the record unless there is any other such record. For example, when a record with a thread identifier "100" is to be deleted in the thread processing multiplicity management table 115 as is shown in FIG. 10, the trace level of the record with a thread identifier "500," which has a method with the same method name "SQLExec" is changed to "0."

The process of the trace manager 113 in this embodiment is substantially similar to that of the trace manager 21 in the first embodiment, except that a method is identified only by its method name. This embodiment provides advantage similar to that provided by the first embodiment.

The present invention is not limited to the embodiments described above, but can be varied for implementation. For example, a thread identifier item is provided in the thread processing multiplicity management table 22 in the above description. This item may not be required if a method is registered for each thread. The table search process may be complicated in this case. Furthermore, means may be provided for accepting input for setting or updating the contents of the tracing condition management table 32.

As described above, according to the present invention, a routine being executed is registered for each thread being activated, and the tracing process level for the routine being executed is determined based on registration information, so that it is possible to collect information required for solving a problem caused by simultaneous access to a shared resource, without having major influence on the operation environment.

We claim:

1. An information processor suitable for executing a routine including a tracing process for collecting information related to multithreading processing status, the information processor comprising:
   routine registration means for registering a routine being executed for each thread being activated; and
   level determination means for determining a level of a tracing process for the routine being executed based on registration information registered by the routine registration means,
   wherein the level determination means indicates permission, in determining the level of the tracing process for the routine being executed, for unrestricted execution of a tracing process if a routine identical to, or in a predetermined relation with, the routine being executed is registered.

2. The information processor according to claim 1, wherein the level determination means performs the level determination of the tracing process for the routine being executed based on whether a routine identical to, or in a predetermined relation with, the routine is registered.

3. The information processor according to claim 2, further comprising a table in which routines having a predetermined mutual relation are specified.

4. The information processor according to claim 3, further comprising means for accepting input for setting or changing the table.

5. The information processor according to claim 2, wherein the routines in a predetermined relation are routines that access a shared resource.

6. The information processor according to claim 1, wherein the level determination means blocks, in determining the level of the tracing process for the routine being executed, execution of a tracing process unless a routine identical to, or in a predetermined relation with, the routine being executed is registered.

7. The information processor according to claim 1, wherein, responsive to registration of a routine, the level determination means adds, if there is already registered a routine identical to or in a predetermined relation with the routine being registered, simultaneous execution information to registration information of both the routine being registered and the routine already registered.

8. The information processor according to claim 7, wherein the simultaneous execution information includes trace level information indicating the level of the tracing process.

9. The information processor according to claim 1, further comprising a server program including the routine and the tracing process; an application execution control part for executing the routine in response to a call of the routine by a client program; and a trace executioner for executing the tracing process in response to a request by the application execution control part; wherein the trace executioner queries, when executing the tracing process, the level determination means to determine the level of the tracing process.

10. The information processor according to claim 1, comprising a program for using the routine including a tracing process; a shared library in which the routine including the tracing process is stored; and a trace executioner for executing the tracing process in response to a request by the routine used by the program; wherein the trace executioner inquires, when executing the tracing process, the level determination means to determine the level of the tracing process.

11. A tracing process method in an information processor suitable for executing a routine including a tracing process for collecting information related to multithreading processing status; the tracing process method comprising:
   a routine registration step for registering a routine being executed for each thread being activated; and
   a level determination step for determining a level of the tracing process for the routine being executed based on information included in the registrations
   wherein the level determination step indicates permission, in determining the level of a tracing process for the routine being executed, for unrestricted execution of the tracing process if any routine identical to, or in a predetermined relation with, the routine being executed is registered.

12. The tracing process method according to claim 11, wherein the level determination step determines the level of the tracing process for the routine being executed based on whether a routine identical to, or in a predetermined relation with, the routine is already registered.

13. The tracing process method according to claim 12, wherein a table, in which routines having a predetermined mutual relation are specified, is referred to in determining the level of the tracing.

14. The tracing process method according to claim 13, further comprising a step of accepting input for setting or changing the table.

15. The tracing process method according to claim 12, wherein routines in the predetermined mutual relation are routines that access a shared resource.

16. The tracing process method according to claim 11, wherein the level determination step blocks, in determining the level of a tracing process for the routine being executed, execution of a tracing process unless a routine identical to, or in a predetermined relation with, the routine being executed is registered.

17. The tracing process method according to claim 11, wherein, responsive to registration of a routine, the level determination step adds, if there is already registered a routine identical to or in a predetermined relation with the routine being registered, simultaneous execution information to registration information of both the routine already registered and the routine being registered.

18. The tracing process method according to claim 17, wherein the simultaneous execution information includes trace level information indicating the level of the tracing process.

19. The tracing process method according to claim 11, further comprising a step of executing a server program including the routine and the tracing process; an application execution control step of executing the routine in response to a call by a client program; and a trace execution step of executing the tracing process occurred at the application execution control step; wherein the tracing execution step refers to the result of the determination at the level determination step in executing the tracing process.

20. The tracing process method according to claim 11, comprising a step of executing a program using the routine and the tracing process; a step of the information processor executing the routine including the tracing process stored in a shared library; and a tracing execution step of the information processor executing the tracing process at the routine execution step; wherein the tracing execution step refers to the result of the determination at the level determination step in executing the tracing process.

* * * * *